United States Patent
Obi et al.

(10) Patent No.: US 9,266,996 B2
(45) Date of Patent: Feb. 23, 2016

(54) CELLULAR STRUCTURES AND VISCOELASTIC POLYURETHANE FOAMS

(71) Applicant: Dow Global Technologies LLC, Midland, MI (US)

(72) Inventors: Bernard E. Obi, Missouri City, TX (US); Alan K. Schrock, Pensacola Beach, FL (US); Rogelio R. Gamboa, Brazoria, TX (US); Asjad Shafi, Lake Jackson, TX (US); Kaoru Aou, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 620 days.

(21) Appl. No.: 13/646,056

(22) Filed: Oct. 5, 2012

(65) Prior Publication Data

US 2013/0035413 A1   Feb. 7, 2013

Related U.S. Application Data

(62) Division of application No. 13/001,673, filed as application No. PCT/US2009/050649 on Jul. 15, 2009, now abandoned.

(60) Provisional application No. 61/081,956, filed on Jul. 18, 2008.

(51) Int. Cl.
| | |
|---|---|
| *C08G 18/48* | (2006.01) |
| *C08G 18/28* | (2006.01) |
| *C08G 18/69* | (2006.01) |
| *C08G 18/76* | (2006.01) |

(52) U.S. Cl.
CPC .......... *C08G 18/4816* (2013.01); *C08G 18/283* (2013.01); *C08G 18/4837* (2013.01); *C08G 18/4854* (2013.01); *C08G 18/69* (2013.01); *C08G 18/7621* (2013.01); *Y10T 428/249953* (2015.04)

(58) Field of Classification Search
CPC .......... C08G 18/4816; C08G 18/4837; C08G 18/4854; C08G 18/7621; C08G 18/69283; Y10T 428/249953
See application file for complete search history.

(56) References Cited

U.S. PATENT DOCUMENTS

| | | | | |
|---|---|---|---|---|
| 4,525,491 | A | * | 6/1985 | Narisawa ........... C08G 18/4837 |
| | | | | 264/328.6 |
| 4,950,694 | A | | 8/1990 | Hager |
| 4,950,695 | A | | 8/1990 | Stone |
| 6,136,879 | A | | 10/2000 | Nishida et al. |
| 6,204,300 | B1 | | 3/2001 | Kageoka et al. |
| 6,391,935 | B1 | | 5/2002 | Hager et al. |
| 6,423,472 | B1 | | 7/2002 | Kumpfmiller et al. |
| 6,433,034 | B1 | | 8/2002 | Leenslag et al. |
| 6,491,846 | B1 | * | 12/2002 | Reese, II .............. C08G 18/283 |
| | | | | 252/182.24 |
| 6,617,369 | B2 | | 9/2003 | Parfondry et al. |
| 6,653,363 | B1 | | 11/2003 | Tursi, Jr. et al. |
| 6,946,467 | B2 | | 9/2005 | Liebeschuetz et al. |
| 7,022,746 | B2 | | 4/2006 | Lockwood et al. |
| 2004/0266900 | A1 | | 12/2004 | Neff et al. |
| 2005/0038133 | A1 | | 2/2005 | Neff et al. |
| 2006/0207187 | A1 | * | 9/2006 | Gaeta ................... B24D 11/001 |
| | | | | 51/293 |
| 2007/0179210 | A1 | | 8/2007 | Swaniker |
| 2007/0237812 | A1 | | 10/2007 | Patel et al. |
| 2009/0087400 | A1 | | 4/2009 | Tamareselvy |
| 2009/0143495 | A1 | | 6/2009 | Nozawa et al. |
| 2011/0136930 | A1 | | 6/2011 | Butler et al. |
| 2013/0237622 | A1 | | 9/2013 | Wujcik et al. |

FOREIGN PATENT DOCUMENTS

| | | | |
|---|---|---|---|
| JP | 5457557 B2 | | 5/1979 |
| WO | 94/26800 A1 | | 11/1994 |
| WO | WO2006/124250 | * | 11/2006 |
| WO | 2008/021034 A2 | | 2/2008 |

OTHER PUBLICATIONS

PCT/WO2010/009205 International Search Report & Written Opinion.
PCT/WO2010/009205 International Preliminary Report on Patentability.

* cited by examiner

*Primary Examiner* — John Cooney

(57) ABSTRACT

The present invention discloses a structure comprising a plurality of three dimensional cells, wherein each cell comprises exterior walls defining an interior void wherein the walls comprise a plurality of struts and windows, the struts forming borders for the plurality of windows, wherein the struts have a plurality of pores. The present invention further discloses a viscoelastic foam having a ratio of elastic modulus (E') at 20° C. to 25% compression force deflection (CFD) of 25 to 125.

6 Claims, 6 Drawing Sheets

CELLULAR STRUCTURES AND VISCOELASTIC POLYURETHANE FOAMS

This application is a divisional of U.S. application Ser. No. 13/001,673, filed on Dec. 28, 2010, now abandoned, which is a national stage application (under 35 U.S.C. §371) of PCT/US09/50649, filed Jul. 15, 2009, which claims benefit under 35 U.S.C. §119 to U.S. Provisional Patent Application No. 61/081,956, filed Jul. 18, 2008.

BACKGROUND OF THE INVENTION

This invention relates to highly porous cellular structures, viscoelastic polyurethane foam, and methods for preparing those foams.

Polyurethane foams are used in a wide variety of applications, ranging from cushioning (such as mattresses, pillows and seat cushions) to packaging to thermal insulation and for medical applications. Polyurethanes have the ability to be tailored to particular applications through the selection of the raw materials that are used to form the polymer. Rigid types of polyurethane foams are used as appliance insulation foams and other thermal insulating applications. Semi-rigid polyurethanes are used in automotive applications such as dashboards and steering wheels. More flexible polyurethane foams are used in cushioning applications, notably furniture, bedding and automotive seating.

One class of polyurethane foam is known as viscoelastic (VE) or "memory" foam. Viscoelastic foams exhibit a time-delayed and rate-dependent response to an applied stress. They have low resiliency and recover slowly when compressed. These properties are often associated with the glass transition temperature ($T_g$) of the polyurethane. Viscoelasticity is often manifested when the polymer has a $T_g$ at or near the use temperature, which is room temperature for many applications.

Like most polyurethane foams, VE polyurethane foams are prepared by the reaction of a polyol component with a polyisocyanate, in the presence of a blowing agent. The blowing agent is usually water or, less preferably, a mixture of water and another material. VE formulations are often characterized by the selection of polyol component and the amount of water in the formulation. The predominant polyol used in these formulations has a functionality of about 3 hydroxyl groups/molecule and a molecular weight in the range of 400-1500. This polyol is primarily the principal determinant of the $T_g$ of the polyurethane foam, although other factors such as water levels and isocyanate index also play significant roles.

Typically viscoelastic polyurethane foams have low air flow properties, generally less than about 1.0 standard cubic feet per minute (scfm) (0.47 l/s) under conditions of room temperature (22° C.) and atmospheric pressure (1 atm), therefore promote sweating when used as comfort foams (for instance, bedding, seating and other cushioning). Low airflow also leads to low heat and moisture conduction out of the foam resulting in (1) increased foam (bed) temperature and (2) moisture level. The consequence of higher temperature is higher resiliency and lowered viscoelastic character. Combined heat and moisture result in accelerated fatigue of the foam. In addition, if foam air flows are sufficiently low, foams can suffer from shrinkage during manufacturing. Furthermore, improving the support factor of viscoelastic foams is limited unless viscoelastic properties are compromised. These disadvantages are sometimes addressed by addition of copolymer polyols such as those containing styrene/acrylonitrile (SAN).

It would be desirable to achieve a higher air flow value than is generally now achieved while retaining viscoelastic properties of the foam. Furthermore, it would be desirable to have foams with good air flow while improving the support factor. In some applications, it is also desirable to have foams which feel soft to the touch.

SUMMARY OF THE INVENTION

Embodiments of the present include an open cell structures, viscoelastic foams incorporating such structures, reaction systems and methods and for producing such foams.

One embodiment provides a structure comprising a plurality of three dimensional cells, wherein each cell comprises exterior walls defining an interior void wherein the walls comprise a plurality of struts and windows, the struts forming borders for the plurality of windows, wherein the struts have a plurality of pores.

A further embodiment provides a viscoelastic foam having a ratio of elastic modulus (E') at 20° C. to 25% compression force deflection (CFD) of 25 to 125.

In a further embodiment the inventions provides for a polyol composition comprising:
a1) from 30 to 80 weight percent of at least one polyoxypropylene or a polyoxyethylene-polyoxypropylene polyol,
having an average equivalent weight between 100 and 2000 and an average nominal hydroxy functionality of 2-4,
with the proviso if the polyol is a polyoxyethylene-polyoxypropylene polyol, the polyoxypropylene content is at least 70% by weight of the polyol;
a2) from 5 to 50 weight percent of a polyoxyethylene or a polyoxyethylene-polyoxypropylene polyol,
having an average equivalent weight between 100 and 1000 and an average nominal hydroxy functionality of 2-4,
with the proviso if the polyol is a polyoxyethylene-polyoxypropylene polyol, the polyoxyethylene content is at least 70% by weight of the polyol; and
a3) from 1 to 20 wt % of a monol or blend of monols having an average equivalent weight of 500 or greater wherein the monol or blend of monol comprises >60% by weight of a polyoxyalkylene wherein the alkylene oxide contains 4 or more carbon atoms; or
a polyoxyalkylene polyol having a functionality of 2 to 4, an equivalent weight of 500 to 3000 wherein the alkylene oxide contains greater than 60% by weight of alkylene oxides having 4 or more carbon atoms;
or a combination of such monol an polyoxyalkylene polyol.

In a further embodiment the invention provides a polyol composition comprising a polyol a1) and a2) as described above and a3) is a polybutadiene having an equivalent weight of 2250 to 6000.

In yet another embodiment the invention provides for a reaction system for the preparation of a viscoelastic polyurethane foam, comprising:
a) any one of the polyol compositions as disclosed above;
b) a polyisocyanate;
c) from 0.5 to 3.5 wt % of water based on the total weight of a) and optionally d) additives and auxiliaries known per se.

In yet another embodiment the invention provides a process for preparing a viscoelastic polyurethane foam, comprising
A) forming a reaction mixture including at least
a) an isocyanate reactive component comprising
a1) from 30 to 80 weight percent of at least one polyoxypropylene or a polyoxyethylene-polyoxypropylene polyol,
having an average equivalent weight between 100 and 2000 and an average nominal hydroxy functionality of 2-4, with the proviso if the polyol is a polyoxyethylene-polyoxypropylene polyol, the polyoxypropylene content is at least 70% by weight of the polyol;

a2) from 5 to 50 weight percent of a polyoxyethylene or a a polyoxyethylene-polyoxypropylene polyol, having an average equivalent weight between 100 and 1000; and an average nominal hydroxy functionality of 2-4, with the proviso if the polyol is a polyoxyethylene-polyoxypropylene polyol, the polyoxyethylene content is at least 70% by weight of the polyol; and a3) from 1 to 20 wt % of a monol or blend of monols having an average equivalent weight of 500 or greater wherein the monol or blend of monol comprises >60% by weight of a polyoxyalkylene wherein the alkylene oxide contains 4 or more carbon atoms; or a polyoxyalkylene polyol having a functionality of 2 to 4, an equivalent weight of 500 to 3000 wherein the alkylene oxide contains greater than 60% by weight of alkylene oxides having 4 or more carbon atoms;

or a combination of such monol an polyoxyalkylene polyol;

b) at least one polyisocyanate, c) water in an amount of 0.5 to 3.5 weight percent of a), and d) optional additives and auxiliaries known per se; and B) subjecting the reaction mixture to conditions sufficient to cause the reaction mixture to expand and cure to form a viscoelastic polyurethane foam.

In a further embodiment the invention provides a process for preparing a viscoelastic polyurethane foam as described above wherein component a3) of the polyol composition is a polybutadiene having an equivalent weight of 2250 to 6000.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. To facilitate understanding, identical reference numerals have been used, where possible, to designate identical elements that are common to the figures. It is contemplated that elements and features of one embodiment may be beneficially incorporated in other embodiments without further recitation. It is to be noted, however, that the appended drawings illustrate only exemplary embodiments of this invention and are therefore not to be considered limiting of its scope, for the invention may admit to other equally effective embodiments.

DETAILED DESCRIPTION OF THE INVENTION

As used herein, term "viscoelastic foam" is intended to designate those foams having a resilience of less than 25%, as measured according to ASTM D3574 Test H. Preferably the foam will have a resilience of less than 20%. If further embodiments the foam will have a resilience of less than 15% or even less than 10%. In certain embodiments the foams have a resiliency of 5% or less and even less than 3%.

As used herein, the term "viscoelasticity" is the time dependent response of a material to an applied constant load (stress) due to the co-existence of elastic (solid) and viscous (liquid) characteristics in the material. In dynamic mechanical characterization, the level of viscoelasticity is proportional to the damping coefficient measured by the tan delta of the material. The tan delta is the ratio of the viscous dissipative loss modulus E" to the elastic modulus E'. High tan delta values imply that there is a high viscous component in the material behavior and hence a strong damping to any perturbation will be observed.

Glass transition temperature" (Tg) is the temperature point corresponding to the peak value of the tan delta curve in a dynamic mechanical thermal analysis (DMTA) measurement. The elastic modulus E', loss modulus E", and the ratio of loss modulus to elastic modulus E"/E' known as the loss tangent or tan delta are measured versus temperature. The temperature corresponding to the peak of the tan delta curve is taken as the glass transition temperature (Tg) of the specimen tested.

As used herein, the term "support factor" refers to the ratio of 65% Compression (Indentation) Force Deflection (CFD) divided by 25% Compression Force Deflection. The term "Compression Force Deflection" refers to a measure of the load bearing capacity of a flexible material (for instance, foam) measured as the force (in pounds) (0.4536 kgf) required to compress a four inch (10 cm) thick sample no smaller than 24 inches square (155 cm$^2$), to 25 or 65 percent of the sample's initial height as indicated by the terms 25% CFD and 65% CFD, respectively.

Figure 1A:
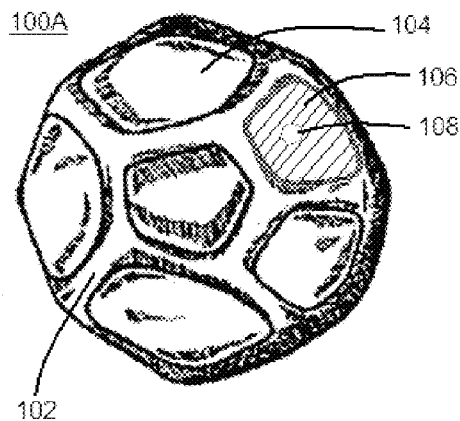
FIGS. 1A and 1B are three dimensional representations of prior art cell structures.
Figure 1B:
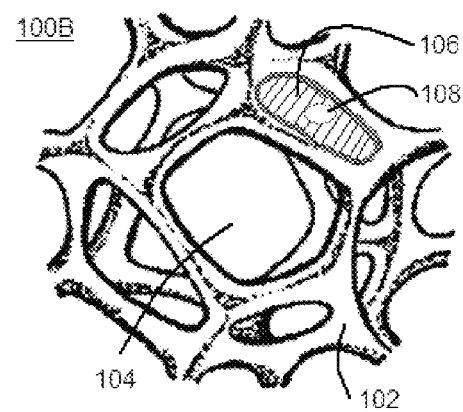
Figure 2:
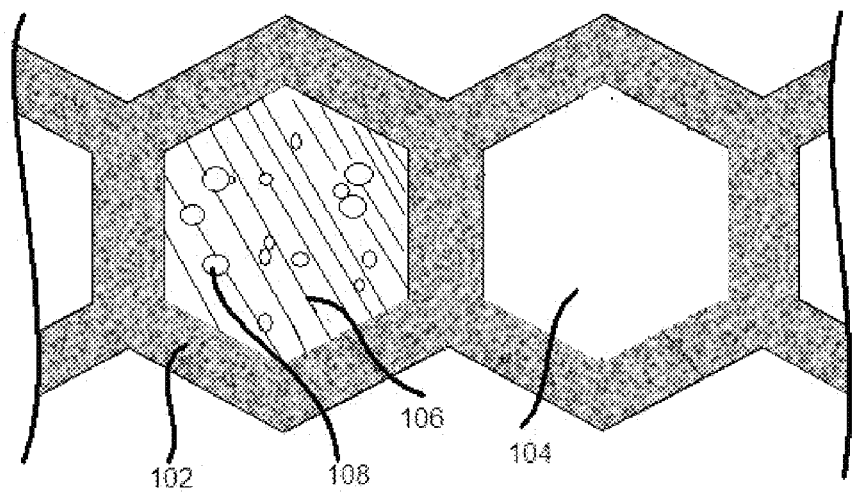
FIG. 2 is a two dimensional representation of prior art cell structures.
Figure 3:
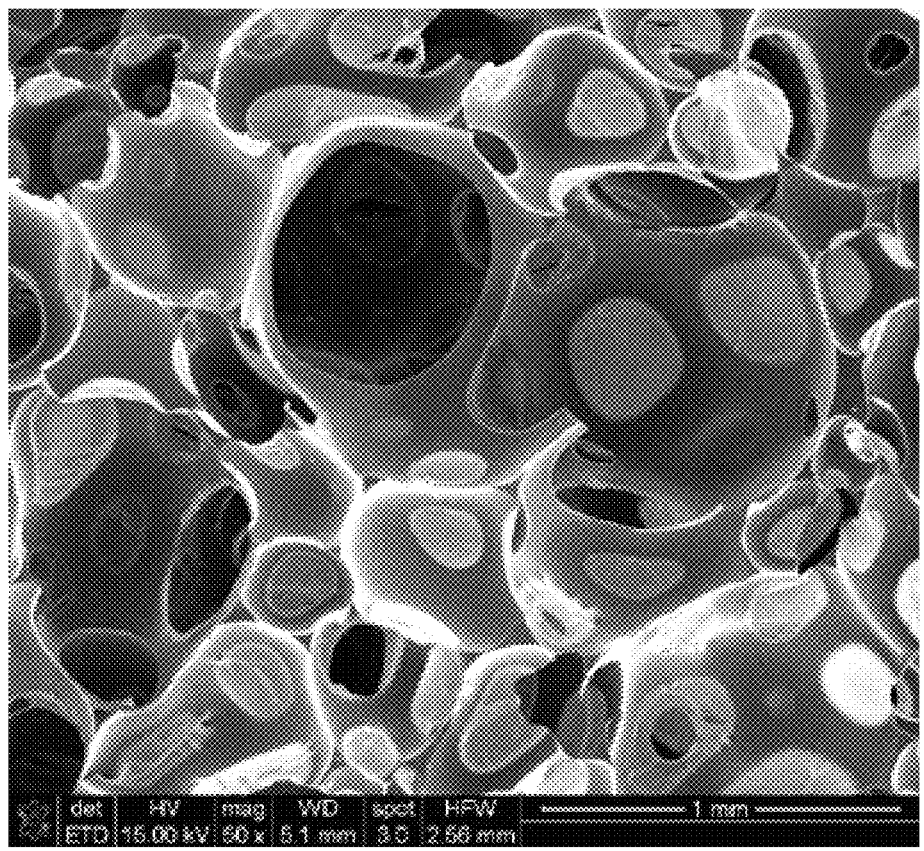
FIG. 3 is a scanning electron micrograph of prior art cell structures.

FIGS. 1A and 1B are representations of prior art three dimensional cell structures 100A and 100B, respectively, and FIG. 2 is a two dimensional representation of aspects of the cell structures 100A and 100B. Each cell structure is made up of exterior walls which define an interior void. The walls include a plurality of cell struts 102 and windows 104. The struts 102 form borders for the plurality of windows 104. The materials that make up cell structures 100A and 100B will upon formation of the cell structures be arranged into the geometric arrangement of cell struts 102. The windows 104 may be closed up by film 106 which is a layer of the same material the struts 102 are made of. Within the cell structures some widows 106 may be covered by the film 106 (the windows are closed), some may not be covered by the film 106 (the windows are open), and some may be partially filled with the film 106. The windows 104 that are partially open may have holes 108 in the film 106. FIG. 3 is a scanning electron micrograph of the prior art cell structures where the struts, windows and holes may be seen.

Figures 4A, 4B:
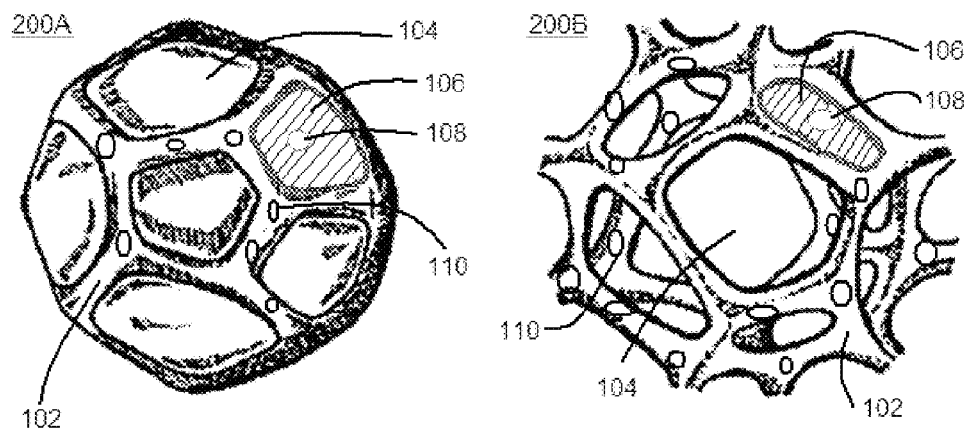
FIGS. 4A and 4B are three dimensional representations of cell structures, according to embodiments of the invention.
Figure 5:
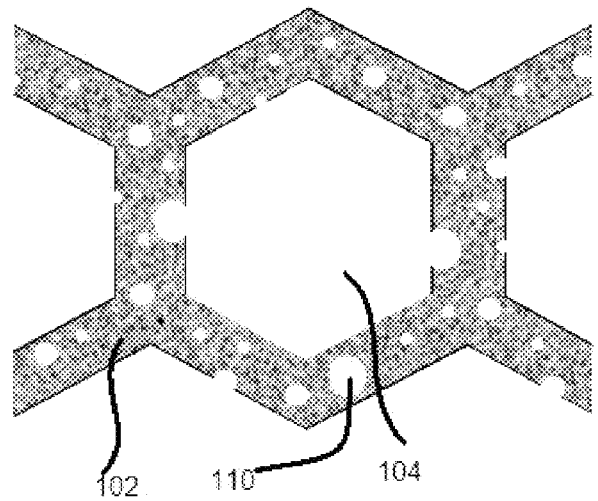
FIG. 5 is a two dimensional representation of cell structures, according to embodiments of the invention.

FIGS. 4A and 4B are representations of three dimensional cell structures 200A and 200B, respectively, and FIG. 5 is a two dimensional representation of aspects of the cell structures 200A and 200B according to embodiments of the invention. Cell structures 200A have may have a plurality of pores 110 which penetrate through the struts 102. The pores 110 may have a width of less than 90 µm. Furthermore, windows 104 may have a width of 100 to 600 µm. In one embodiment more than 30% of the windows are open or partially open, in another, more than 40% are open or partially open, in another, more than 50% are open or partially open, in another, more than 60% are open or partially open, in another, more than 70% are open or partially open, in another, more than 80% are open or partially open, in another, more than 90% are open or partially open, in another, more than 95% are open or partially open, and in another, more than 99% are open or partially open.

In another embodiment more than 30% of the windows are open, in another, more than 40% are open, in another, more than 50% are open, in another, more than 60% are open, in another, more than 70% are open, in another, more than 80% are open, in another, more than 90% are open, in another, more than 95% are open, and in another, more than 99% are open. In one embodiment essentially all the windows 104 are open.

Figure 6A:
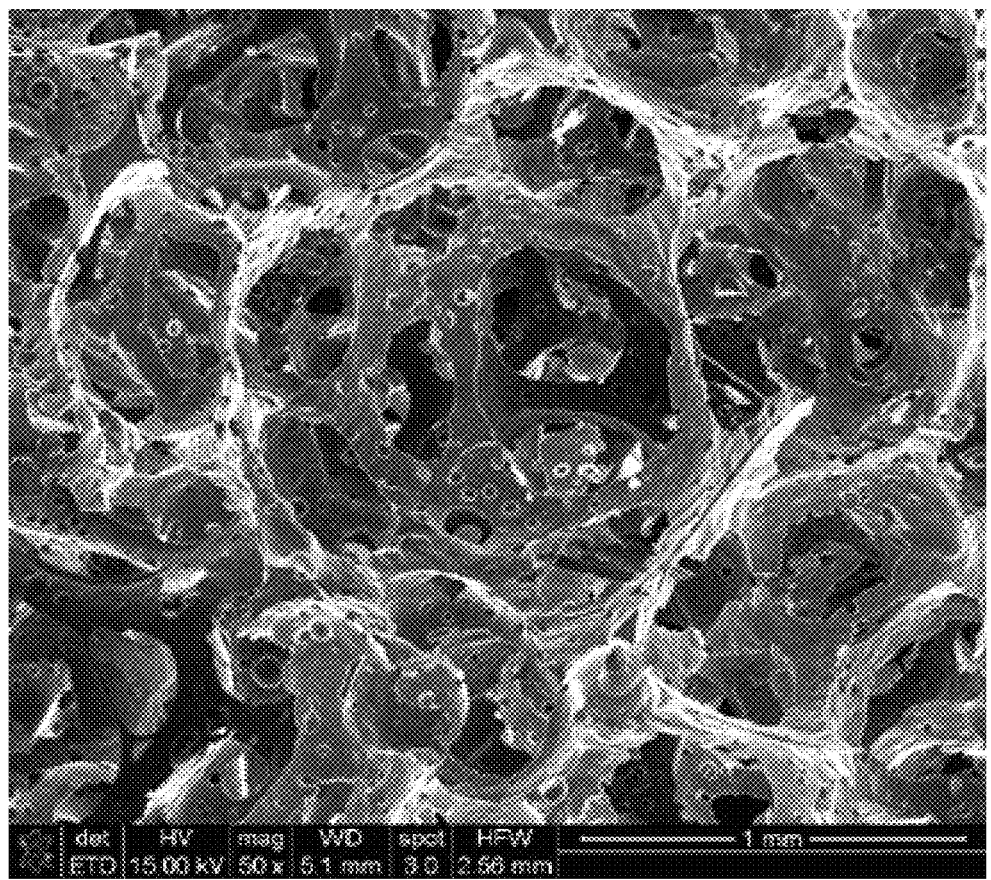
FIGS. 6A and 6B are scanning electron micrographs of a cell according to embodiments of the present invention.
Figure 6B:
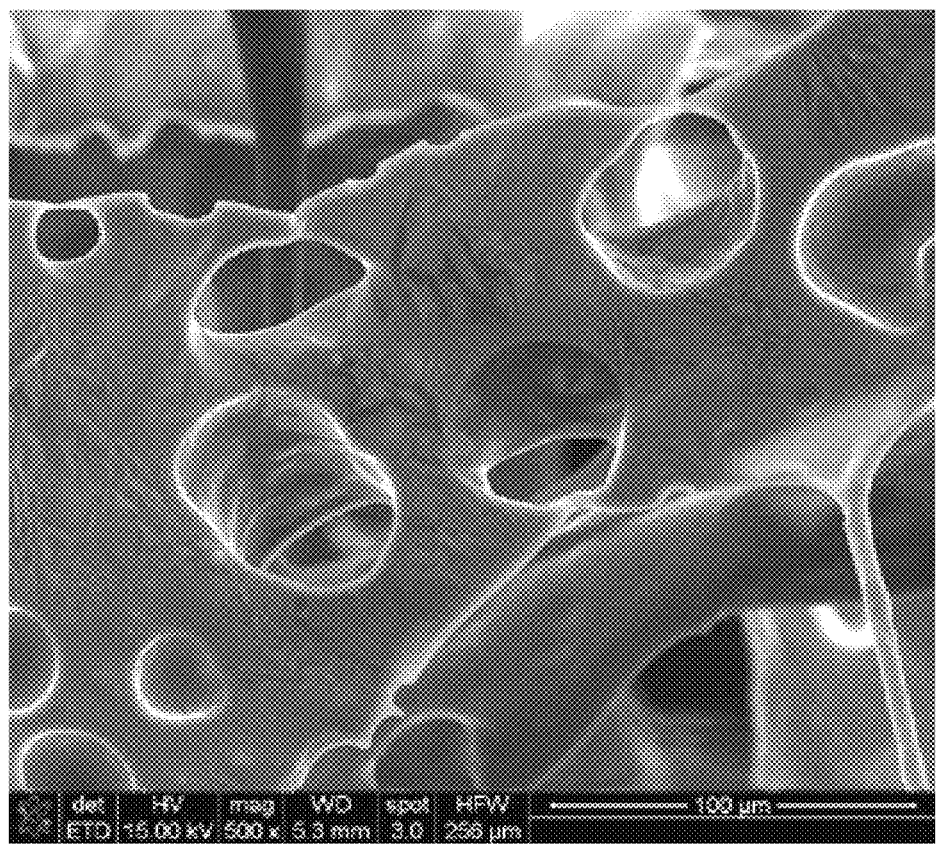

FIGS. 6A and 6B are scanning electron micrographs of a cell structure according to embodiments of the invention. The figures show the pores 110 penetrating the struts 102.

The highly porous structures (open cells and pores in the cell struts) allows production of a viscoelastic foam with good air flow and a soft feel as evidenced by a low 25% CFD. Surprisingly, even with the high porous structure and low 25% CFD the foams have a good support factor. It is also unexpected such porous foams with a low 25% CFD would still maintain a high elastic modulus E', a measure of the stiffness of a polymer. It is further unexpected such foam would have a high tan delta (>0.3) over a broad temperature.

The foams of the present invention generally have an air flow of 2 scfm (standard cubic feet per minute) or greater. In another embodiment, the air flow of the foam is greater than 2.3 scfm. Due to practical consideration to have a foam with sufficient support, the foam generally has an air flow of less than 8 scfm. In a further embodiment the foam has an air flow of 7 scfm or less. In a further embodiment, the foam will have an air flow from 2.3 scfm to 6.25 scfm.

The foams having a soft feel while maintaining good elastic modulus can be represented by the ratio of the elastic modulus (measured at 20° C.) to the 25% CFD. Viscoelastic foams of the present invention will have a elastic modulus to 25% CFD ratio of 25 or greater. Preferably the ratio will be 30 or greater. In a further embodiment, the ratio is 35 or greater. The ratio will generally be 125 or less. In some embodiments the ratio may be 115 or less. In yet other embodiments, the ratio will be 110 or less.

The foams of the present invention exhibit a tan delta of greater than 0.3 over the temperature range of 0 to 40° C. In further embodiments the tan delta is 0.4 or greater over the temperature range of 0 to 40° C., particularly 0.4 or greater over the temperature range of 18 to 40° C.

The cured VE foam advantageously has a density in the range of 2.5 to 30 pounds/cubic foot (pcf) (40-480 kg/m$^3$), preferably the density is 3.0 pounds/cubic foot (48 kg/m$^3$) or greater. Preferably the density is up to 20 lb/ft$^3$ (320 kg/m$^3$). In a further embodiment, the density is 10 lb/ft$^3$ (160 kg/m$^3$) or less. Density is conventionally measured according to ASTM D 3574-01 Test A.

In one embodiment of the invention the viscoelastic foam is a reaction product of a reaction system where the reaction system includes an isocyanate component and isocyanate-reactive component. The isocyanate-reactive component used in polyurethane production are generally those compounds having at least two hydroxyl groups or amine groups. Those compounds are referred to herein as polyols. In one embodiment the polyols are polyether polyols which contain reactive hydroxyl groups.

The polyether polyols include those obtained by the alkoxylation of suitable starting molecules (initiators) with an alkylene oxide. Examples of initiator molecules having 2 to 4 reactive sites include water, ammonia, or polyhydric alcohols such as dihyric alcohols having a molecular weight of 62-399, especially the alkane polyols such as ethylene glycol, propylene glycol, hexamethylene diol, glycerol, trimethylol propane or trimethylol ethane, or low molecular weight alcohols containing ether groups such as diethylene glycol, triethylene glycol, dipropylene glyol, tripropylene glycol or butylene glycols. These polyols are conventional materials prepared by conventional methods. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. In the case of alkaline catalysts, these alkaline catalysts are preferably removed from the polyol at the end of production by a proper finishing step, such as coalescence, magnesium silicate separation or acid neutralization.

In an embodiment of the present invention, the isocyanate-reactive component is a polyol composition comprising:
a1) from 30 to 80 weight percent of at least one polyoxypropylene or a polyoxyethylene-polyoxypropylene polyol,
having a number average equivalent weight between 100 and 2000
and a number average nominal hydroxy functionality of 2-4,
with the proviso if the polyol is a polyoxyethylene-polyoxypropylene polyol, the polyoxypropylene content is at least 70% by weight of the polyol;
a2) from 5 to 50 weight percent of a polyoxyethylene or a a polyoxyethylene-polyoxypropylene polyol,
having a number average equivalent weight between 100 and 1000;
and a number average nominal hydroxy functionality of 2-4,
with the proviso if the polyol is a polyoxyethylene-polyoxypropylene polyol, the polyoxyethylene content is at least 70% by weight of the polyol; and
a3) from 1 to 20 wt % of a monol or blend of monols having an average equivalent weight of 500 or greater wherein the monol or blend of monol comprises >60% by weight of a polyoxyalkylene wherein the alkylene oxide contains 4 or more carbon atoms;
a polyoxyalkylene polyol having a number average functionality of 2 to 4, a number average equivalent weight of 500 to 3000 wherein the alkylene oxide contains greater than 60% by weight of alkylene oxides having 4 or more carbon atoms;
a polybutadiene having an equivalent weight of 2250 to 6000
or a combination thereof.

The polyoxypropylene based polyol a1) will generally contain greater than 70% by weight of oxyalkylene units derived from propylene oxide (PO) units and preferably at least 75% by weight of oxyalkylene units derived from PO. In other embodiments the polyol will contain greater than 80 wt % of oxyalkylene units derived from PO and in a further embodiment, 85 wt % or more of the oxyalkylene units will be derived from PO. In some embodiments, propylene oxide will be the sole alkylene oxide used in the production of the polyol. When ethylene oxide (EO) is used in the production of polyol a1), it is preferred the EO is fed as a co-feed with the PO or fed as an internal block.

The polyol component a1) in further embodiments will comprise 35 wt %, 40 wt %, or 45 wt % of the total polyol composition. The polyol component a1) may comprise 60 wt %, 65 wt %, 70 wt % and even up to 80 wt % of the total polyol composition.

In a further embodiment, polyol a1) will comprise two separate components; at least one polyol having a number average equivalent weight of less than 700 (designated a1a) and at least one second polyol having an equivalent weight of 700 or greater (designated a1b). The polyol components a1a) and a1b) may independently contain weight percents derived from PO as described above for polyol a1).

When two separate polyols a1a) and a1b) are used, the polyol component a1a) will generally comprise at least 5 wt %, 10 wt % or at least 15 wt % of the total polyol composition a). Polyol component a1a) may comprise at least 50 wt %, 55 wt %, 60 wt % and even up to 79 wt % of the total polyol. The equivalent weight of polyol a1a) will generally be from 100 to less than 700 and preferably from 150 to 650. In other embodiments, the equivalent weight is from 200 to 650.

When both polyols a1a) and a1b) are present, polyol a1b) will generally comprise at least 1 wt %, at least 3 wt % or at least 5 wt % of the total polyol. Polyol a1b) will generally comprise less than 25 wt %, preferably less than 20 wt % or even less than 17 wt % of the total polyol present. The equivalent weight of polyol a1b) is from 700 to 2000. Preferably the equivalent weight of polyol a1b) is from 750 to 1750. In a further embodiment, the equivalent weight of polyol a1b) is from 800 to 1450. In another embodiment the equivalent weight of polyol a1b) is less than 1250.

Polyol a2) is a polyoxyethylene based polyol containing greater than 70% by weight of oxyethylene units, preferably at least 75% oxyethylene units, more preferably at least 80% oxyethylene units, still in a further embodiment at least 90%, and even at least 93% oxyethylene units by weight. In some embodiments, a2) is essentially free of oxyalkylene units other than oxyethylene units. Polyol a2) generally has a nominal functionality of bound hydroxyl groups of 2 to 4, preferably 2 to 3, and in some embodiments a nominal functionality of 3.

The number averaged equivalent weight of a2) relative to the combined total of hydroxyl groups in the polyol, is from 100 to 1000; from 150 to 825; from 175 to 750, and in some embodiments from 190 to 500, and even from 200 to less than 500.

The polyol component a2) in further embodiments will comprise at least 10 wt %, 14 wt %, or 17 wt % of the total polyol composition. The polyol component a1) may comprise less than 44 wt %, 40 wt %, 35 wt % or less than 30 wt % of the total polyol.

Component a3) of the polyol composition is a monol or blend of monols having an average equivalent weight of 500 or greater wherein the monol or blend of monol comprises >60% by weight of a polyoxyalkylene wherein the alkylene oxide units in the polyoxyalkene polymer contains 4 or more carbon atoms;

a polyoxyalkylene polyol having a functionality of 2 to 4, an equivalent weight of 500 to 3000 wherein the polyoxyalkylene contains greater than 60% by weight of alkylene oxides having 4 or more carbon atoms;

a polybutadiene having an equivalent weight of 2250 to 6000, or a combination thereof.

In one embodiment the component of a3) is a monol wherein the monol is derived from one or more alkylene oxides having from 4 to 20 carbon atoms. Preferably the alkylene oxide is 18 carbon atoms or less. The monol will generally have an equivalent weight of 500 or greater, 750 or greater and in some embodiments, 1000 or greater. In one embodiment the monol is derived from a C4 or C5 oxide, or a combination thereof. When the monol is derived from C4 and C5 oxides, the monol may have an equivalent weight of 2000 or greater and in some embodiments 3000 and greater. Due to processing limitations, the monol will generally have an equivalent weight of less than 12,000 and generally less than 10,000. In one embodiment, the monol is derived from butylene oxide, tetramethylene oxide, or a combination thereof and has an equivalent weight of 2,500 to 7,000. In a further embodiment the monol has an equivalent weight from 3,000 to 6,000.

In another embodiment, the monol will be present in the polyol formulation at less than 15 wt % of the total polyol composition. In a further embodiment, the monol is less than 12 wt % of the polyol composition. In other embodiments, the monol will comprise at least 2%, at least 3% or at least 5% by weight of the polyol composition.

The monol of a3) can be a polyester. Polyesters contain recurring units of a carboxylic acid derivative (e.g., anhydride, diacid) and a glycol or diol. The polyester contains only one hydroxyl group. The other end groups are ones that do not react with isocyanates, such as alkyl, aryl, or aralkyl-substituted ethers or esters.

Monol are made by techniques known in the art. These are conveniently made by reacting a monoalcohol (methanol, ethanol, phenols, allyl alcohol, higher molecular weight alcohols, or the like) with multiple equivalents of an epoxide as described above. The epoxide can be polymerized using well-known techniques and a variety of catalysts, including alkali metals, alkali metal hydroxides and alkoxides, double metal cyanide complexes, and many others. The monols can also be made by first producing a polyoxyalkylene diol or triol and then converting all but one of the remaining hydroxyl groups to ether, ester, or other non-reactive derivatives using known methods.

When component a3) is a polyol as described above, the levels present in the polyol composition may be as those given above for the monol. In a like manner, the polyol will be derived from alkoxylation of an initiator with an alkylene oxide having from 4 to 20 carbon atoms, less than 18 carbon atoms and in some embodiments less than 12 carbon atoms. In one embodiment the alkylene oxide is a C4 to C8 alkylene oxide and in a further embodiment a C4 to C6 alkylene oxide.

In a further embodiment, the polyol component of a3) will have an equivalent weight of 750 or greater. In another embodiment, the polyol of component a3) will have an equivalent weight of 1000 or greater.

In a further embodiment component a3) can be a polybutadiene wherein the polybutadiene comprises 1 to 20 wt % of the total polyol composition. Processes for the production of polybutadiene are known in the art. In one embodiment, the polybutadiene may be a non-branched hydroxyl-terminated polybutadiene which contains an average of 1.8 to 2.0 terminal hydroxyl groups and have a weight average equivalent weight of 2250 to 6,000, preferably from 2400 to 5800 and more preferably about 2275 to 5,500. Such non-branched polybutadienes are derived from anionic polymerization and may be produced according to the procedure of U.S. Pat. No. 6,864,321.

Component b) is an organic polyisocyanate having an average of 1.8 or more isocyanate groups per molecule. The isocyanate functionality is preferably from about 1.9 to 4, and more preferably from 1.9 to 3.5 and especially from 1.9 to 2.5. Suitable polyisocyanates include aromatic, aliphatic and cycloaliphatic polyisocyanates. Aromatic polyisocyanates are generally preferred based on cost, availability and properties imparted to the product polyurethane. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4', 4"-triphenylmethane tri-isocyanate, polymethylene polyphenylisocyanates, hydrogenated polymethylene polyphenylisocyanates, toluene-2,4,6-triisocyanate, and 4,4'-dimethyl diphenylmethane-2,2',5,5'-tetraisocyanate. Preferred polyisocyanates include MDI and derivatives of MDI such as biuret-modified "liquid" MDI products and polymeric MDI, as well as mixtures of the 2,4- and 2,6-isomers of TDI.

A polyisocyanate of particular interest is a mixture of 2,4- and 2,6-toluene diisocyanate containing at least 60% by weight of the 2,4-isomer. In another embodiment, the polyisocyanate is a mixture of 2,4- and 2,6-toluene diisocyanate containing at about 80% by weight of the 2,4-isomers. These polyisocyanate mixtures are widely available and are relatively inexpensive, yet have heretofore been difficult to use in commercial scale VE foam processes due to difficulties in processing the foam formulation.

In a further embodiment polyisocyanate has a number average functionality of isocyanate groups of greater than 2.1 and consists predominantly, on a weight bases, of one or more polyisocyanates of the MDI series.

The amount of polyisocyanate that is used typically is sufficient to provide an isocyanate index of from 70 to 115. In another the index is from 85 to 110 and in a further embodiment from 85 to 105. The isocyanate index is the equivalents of isocyanate, divided by the total equivalents of isocyanate-reactive hydrogen containing materials, multiplied by 100.

The foam formulation includes water, in an amount from about 0.5 to about 3.5 parts per 100 parts by weight of the polyol or polyol mixture. The invention is of particular interest in formulations in which the water content is from about 0.8 to about 2.5 parts, especially from 1.0 to 2.25 parts, and in a further embodiment from 0.8 to 1.8 parts, by weight per 100 parts by weight polyol.

The reaction system may optionally contain minor amounts of up to 10% by weight of the total reaction system (but typically zero or up to less than 5 wt %) of reactive (polymer forming) species, not including any chain extenders, cross linkers or reactive fillers as described herein, other than those specified above. These may include, for example, species containing primary and/or secondary amines, polyester polyols or polyols different than those described above.

A wide variety of materials are known to catalyze polyurethane forming reactions, including tertiary amines; tertiary phosphines such as trialkylphosphines and dialkylbenzylphosphines; various metal chelates such as those which can be obtained from acetylacetone, benzoylacetone, trifluoroacetyl acetone, ethyl acetoacetate and the like, with metals such as Be, Mg, Zn, Cd, Pd, Ti, Zr, Sn, As, Bi, Cr, Mo, Mn, Fe, Co and Ni; acid metal salts of strong acids, such as ferric chloride, stannic chloride, stannous chloride, antimony trichloride, bismuth nitrate and bismuth chloride; strong bases such as alkali and alkaline earth metal hydroxides, alkoxides and phenoxides, various metal alcoholates and phenolates such as Ti(OR)4, Sn(OR)4 and Al(OR)3, wherein R is alkyl or aryl, and the reaction products of the alcoholates with carboxylic acids, beta-diketones and 2-(N,N-dialkylamino) alcohols; alkaline earth metal, Bi, Pb, Sn or Al carboxylate salts; and tetravalent tin compounds, and tri- or pentavalent bismuth, antimony or arsenic compounds. Preferred catalysts include tertiary amine catalysts and organotin catalysts. Examples of commercially available tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used. Examples of commercially available amine catalysts include Niax™ A1 and Niax™ A99 (bis (dimethylaminoethyl)ether in propylene glycol available from GE Advanced Materials, Silicones), Niax™ B9 (N,N-dimethylpiperazine and N-N-dimethylhexadecylamine in a polyalkylene oxide polyol, available from GE Advanced Materials, Silicones), Dabco™ 8264 (a mixture of bis(dimethylaminoethyl)ether, triethylenediamine and dimethylhydroxyethyl amine in dipropylene glycol, available from Air Products and Chemicals), and Dabco™ 33LV (triethylene diamine in dipropylene glycol, available from Air Products and Chemicals), Niax™ A-400 (a proprietary tertiary amine/carboxylic salt and bis (2-dimethylaminoethy)ether in water and a proprietary hydroxyl compound, available from GE Advanced Materials, Silicones); Niax™ A-300 (a proprietary tertiary amine/carboxylic salt and triethylenediamine in water, available from GE Advanced Materials, Silicones); Polycat™ 58 (a proprietary amine catalyst available from Air Products and Chemicals), Polycat™ 5 (pentamethyl diethylene triamine, available from Air Products and Chemicals) and Polycat™ 8 (N,N-dimethyl cyclohexylamine, available from Air Products and Chemicals).

Examples of organotin catalysts are stannic chloride, stannous chloride, stannous octoate, stannous oleate, dimethyltin dilaurate, dibutyltin dilaurate, other organotin compounds of the formula SnRn(OR)4-n, wherein R is alkyl or aryl and n is 0-2, and the like. Organotin catalysts are generally used in conjunction with one or more tertiary amine catalysts, if used at all. Commercially available organotin catalysts of interest include Dabco™ T-9 and T-95 catalysts (both stannous octoate compositions available from Air Products and Chemicals).

Catalysts are typically used in small amounts, for example, each catalyst being employed from about 0.0015 to about 5% by weight of the natural oil derived polyol composition. The amount depends on the catalyst or mixture of catalysts, the desired balance of the gelling and blowing reactions for specific equipment, the reactivity of the polyols and isocyanate as well as other factors familiar to those skilled in the art.

In a further embodiment, to improve processing and to permit the use of higher isocyanate indices, additives e) such as those described in publication WO 20008/021034, the disclosure of which is incorporated herein by reference, may be added to the reaction mixture. Such additive include 1) alkali metal or transition metal salts of carboxylic acids;

2) 1,3,5-tris alkyl- or 1,3,5-tris (N,N-dialkyl amino alkyl)-hexahydro-s-triazine compounds; and 3) carboxylate salts of quaternary ammonium compounds.

When used, such additives are generally used in an amount from about 0.01 to 1 part per 100 parts by weight of component a).

The component e) additive is generally dissolved in at least one other component of the reaction mixture. It is generally not preferred to dissolve it in the polyisocyanate.

Various additional components may be included in the viscoelastic foam formulation. These include, for example, chain extenders, crosslinkers, surfactants, plasticizers, fillers, plasticizers, smoke supresants, fragrances, reinforcements, dyes, colorants, pigments, preservatives, odor masks, physical blowing agents, chemical blowing agents, flame retardants, internal mold release agents, biocides, antioxidants, UV stabilizers, antistatic agents, thixotropic agents, adhesion promoters, cell openers, and combination of these.

The foamable composition may contain a cell opener, chain extender or crosslinker. When these materials used, they are typically used in small quantities such as up to 10 parts, especially up to 2 parts, by weight per 100 parts by weight polyol or polyol mixture. A chain extender is a material having two isocyanate-reactive groups/molecule, whereas a crosslinker contains on average greater than two isocyanate-reactive groups/molecule. In either case, the equivalent weight per isocyanate-reactive group can range from about 30 to less than 100, and is generally from 30 to 75. The isocyanate-reactive groups are preferably aliphatic alcohol, primary amine or secondary amine groups, with aliphatic alcohol groups being particularly preferred. Examples of chain extenders and crosslinkers include alkylene glycols such as ethylene glycol, 1,2- or 1,3-propylene glycol, 1,4-butanediol, 1,6-hexanediol, and the like; glycol ethers such as diethylene glycol.

A surfactant may be included in the viscoelastic foam formulation to help stabilize the foam as it expands and cures. Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids may also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as Tegostab (trademark of Goldschmidt Chemical Corp.) B-8462 and B-8404, and DC-198 and DC-5043 surfactants, available from Dow Corning, and Niax™ 627 surfactant from OSi Specialties.

When a surfactant is used, it is typically present in an amount of 0.0015 to 1 part by weight per 100 parts by weight polyol or polyol mixture.

One or more fillers may also be present in the vicoelastic foam formulation. A filler may help modify the composition's rheological properties in a beneficial way, reduce cost and impart beneficial physical properties to the foam. Suitable fillers include particulate inorganic and organic materials that are stable and do not melt at the temperatures encountered during the polyurethane-forming reaction. Examples of suitable fillers include kaolin, montmorillonite, calcium carbonate, mica, wollastonite, talc, high-melting thermoplastics, glass, fly ash, carbon black titanium dioxide, iron oxide, chromium oxide, azo/diazo dyes, phthalocyanines, dioxazines and the like. The filler may impart thixotropic properties to the foamable polyurethane composition. Fumed silica is an example of such a filler.

Reactive particles may also be included in the reaction system to modify the properties of the viscoelatic foam. Such reactive systems include copolymer polyols such as those containing styrene/acrylonitrile (SAN), polyharnstoff dispersion (PHD) polyols and polyisocyanate polyaddition products (PIPA), for instance as taught in Chemistry and Technology of Polyols for Polyurethanes, Rapra Technology Limited (2005) pp 185-227.

When used, fillers advantageously constitute from about 0.5 to about 30%, especially about 0.5 to about 10%, by weight of the composition.

Although no additional blowing agent (other than the water) in the foamable polyurethane composition is generally used, it is within the scope of the invention to include an additional physical or chemical blowing agent. Among the physical blowing agents are supercritical CO2 and various hydrocarbons, fluorocarbons, hydrofluorocarbons, chlorocarbons (such as methylene chloride), chlorofluorocarbons and hydrochlorofluorocarbons. Chemical blowing agents are materials that decompose or react (other than with isocyanate groups) at elevated temperatures to produce carbon dioxide and/or nitrogen.

The VE foam can be prepared in a so-called slabstock process, or by various molding processes. In a slabstock process, the components are mixed and poured into a trough or other region where the formulation reacts, expands freely in at least one direction, and cures. Slabstock processes are generally operated continuously at commercial scales.

In a slabstock process, the various components are introduced individually or in various subcombinations into a mixing head, where they are mixed and dispensed. Component temperatures are generally in the range of from 15 to 35° C. prior to mixing. The dispensed mixture typically expands and cures without applied heat. In the slabstock process, the reacting mixture expands freely or under minimal restraint (such as may be applied due to the weight of a cover sheet or film).

It is also possible to produce the viscoelastic foam in a molding process, by introducing the reaction mixture into a closed mold where it expands and cures.

Viscoelastic foam made in accordance with the invention are useful in a variety of packaging and cushioning applications, such as mattresses, including mattress toppers, pillows, packaging, bumper pads, sport and medical equipment, helmet liners, pilot seats, earplugs, and various noise and vibration dampening applications. The noise and vibration dampening applications are of particular importance for the transportation industry, such as in automotive applications.

The following examples are provided to illustrate the invention, but are not intended to limit the scope thereof. All parts and percentages are by weight unless otherwise indicated.

A description of the raw materials used in the examples is as follows.

Polyol A is a 3 functional, 336 equivalent weight all propylene oxide polyether polyol commercially available from The Dow Chemical Company under the trade designation Voranol 3150.

Polyol B is a 6.9 functional, 1800 approximate equivalent weight random copolymer of ethylene oxide and propylene oxide commercially available from The Dow Chemical Company under the trade designation Voranol 4053 polyol.

Polyol C is a three functional; all ethylene oxide feed polyol, with an EW of approximately 208.

Polyol D is a glycerin initiated polyoxyethlene-polyoxypropylene mixed fed polyol (8 wt % EO) having an equivalent weight of approximately 994 available from The Dow Chemical Company under the trade designation Voranol 3010 polyol.

Monol A is an all butylene oxide monol having an equivalent weight of approximately 4,000.'

Diol A is a polybutadiene diol with an approximate equivalent weight of 5,000 available from Sartomer as Krasol™ LBH 10000.

Surfactant A is an organosilicone surfactant sold commercially by OSi Specialties as Niax® L-627 surfactant.

Tin Catalyst A is a stannous octoate catalyst available commercially from Air Products and Chemicals as Dabco® T-9 catalyst.

Amine catalyst A is a 70% bis-dimethylaminoethyl ether solution in dipropylene glycol, commercially supplied as DABCO® BL11 catalyst by Air Products and Chemicals, Inc.

Amine catalyst B is a 33% solution of triethylene diamine in dipropylene glycol, available commercially from Air Products and Chemicals as Dabco® 33LV.

TDI 80 is an 80/20 blend of the 2,4- and 2,6-isomers of toluene diisocyanate available from The Dow Chemical Company.

Test Methods

Unless otherwise specified, the foam properties are measured by ASTM 3574-05.

EXAMPLES 1 to 7 and Control (C1).

The foams are prepared by first blending the polyols, water, and amine catalysts in a high shear rate mix head. Component temperatures are approximately 22° C. This mixture is then blended in the same manner with the surfactant and tin catalyst, and the resulting mixture then blended, again in the same manner, with the polyisocyanate. The final blend is immediately poured into an open box and allowed to react without applied heat. Total formulation weights are 2000-2700 grams. Formulations used for producing polyurethane foam are given in Table 1. Example C1 is a control foam based on a formulation for production of a viscoelastic foam. The cured formulations are aged for a minimum of seven days and taken for property testing. The properties of the produced foams are given in Table 2.

The data shows foams based the present invention have good air flow and low compression force deflection 25%. The foam of the present inventions also have a good support factor, showing better support when compared to a standard formulation at the same index.

TABLE 1

|  | 1C | 1 | 2 | 3 | 4 | 5 | 6 | 7 |
| --- | --- | --- | --- | --- | --- | --- | --- | --- |
| Polyol A | 95 | 55 | 55 | 55 | 55 | 55 | 55 | 55 |
| Polyol B | 5 | 0 | 0 | 0 | 0 | 0 | 0 | |
| Polyol C | 0 | 25 | 25 | 25 | 25 | 25 | 25 | 25 |
| Polyol D | 0 | 10 | 10 | 10 | 10 | 10 | 10 | 10 |
| Monol A | 0 | 10 | 10 | 10 | 10 | 10 | 10 | |
| Diol A | | | | | | | | 10 |
| H2O | 1.25 | 1.25 | 1.25 | 1.25 | 1.25 | 1.25 | 1.25 | 1.25 |
| Surfactant A | 1 | 0.9 | 0.9 | 0.9 | 0.9 | 0.9 | 0.9 | 0.9 |
| Amine Catalyst A | 0.15 | 0.15 | 0.15 | 0.15 | 0.15 | 0.15 | 0.15 | 0.15 |
| Amine Catalyst B | 0.3 | 0.2 | 0.2 | 0.2 | 0.2 | 0.2 | 0.2 | 0.20 |
| Tin Catalyst A | 0.03 | 0.02 | 0.02 | 0.02 | 0.02 | 0.02 | 0.02 | 0 |
| Total | 102.73 | 102.52 | 102.52 | 102.52 | 102.52 | 102.52 | 102.52 | 102.50 |
| ISOCYANATE INDEX | 90 | 90 | 92 | 94 | 96 | 98 | 100 | 90 |
| T-80 | 33.27 | 34.13 | 34.88 | 35.64 | 36.40 | 37.16 | 37.92 | 34.13 |
| Total Mass | 136.0 | 136.6 | 137.4 | 138.2 | 138.9 | 139.7 | 140.4 | 136.63 |

TABLE 2

|  | 1C | 1 | 2 | 3 | 4 | 5 | 6 | 7 |
| --- | --- | --- | --- | --- | --- | --- | --- | --- |
| Tensile Strength (psi) (6.8948 KPa) | 7.1 | 1.48 | 3.76 | 4.75 | 9.39 | 10.44 | 10.3 | 4.23 |
| % Elongation | 121.22 | 77.99 | 92.99 | 102.35 | 127.24 | 113.05 | 117.7 | 174 |
| Tear Strenth (pli) (0.1786 Kg/cm) | 0.91 | 0.29 | 0.51 | 0.76 | 1.29 | 1.24 | 1.55 | 0.53 |
| Air Flow (scfm) (.4720 l/s) | 0.23 | 6.17 | 4.46 | 3.70 | 2.73 | 2.35 | 3.00 | 0.60 |
| Density (pcf) (16.02 Kg/m3) | 4.15 | 4.06 | 3.55 | 3.43 | 3.44 | 3.49 | 3.81 | 5.29 |
| Recovery Time (Sec) | 5.5 | 2.00 | 3.00 | 3.00 | 2.00 | 2.00 | 2.0 | |
| CFD Load @ 25% (lbf) (0.4536 kgf) | 3.79 | 0.71 | 1.37 | 1.76 | 2.77 | 4.76 | 3.24 | 1.04 |
| CFD Load @ 65% (lbf) (0.4536 kgf) | 8.3 | 2.58 | 3.92 | 4.67 | 6.35 | 10.18 | 7.0 | 4.35 |
| CFD Load @ 75% (lbf) (0.4536 kgf) | 15.77 | 5.23 | 7.51 | 8.81 | 11.49 | 17.76 | 12.48 | 9.34 |
| Support Factor | 2.2 | 3.62 | 2.85 | 2.66 | 2.29 | 2.14 | 2.16 | 4.18 |
| Average Resiliency (%) | 4.0 | 6.00 | 8.00 | 8.00 | 6.00 | 4.00 | 5.6 | 1 |
| Compression Set 75% | 2.41 | 1.20 | 0.68 | 0.48 | 0.37 | 0.18 | 0.4983 | 8 |
| Compression Set 90% | 1.89 | 1.42 | 0.85 | 0.68 | 0.42 | 0.22 | 0.5037 | |

Figure 7:
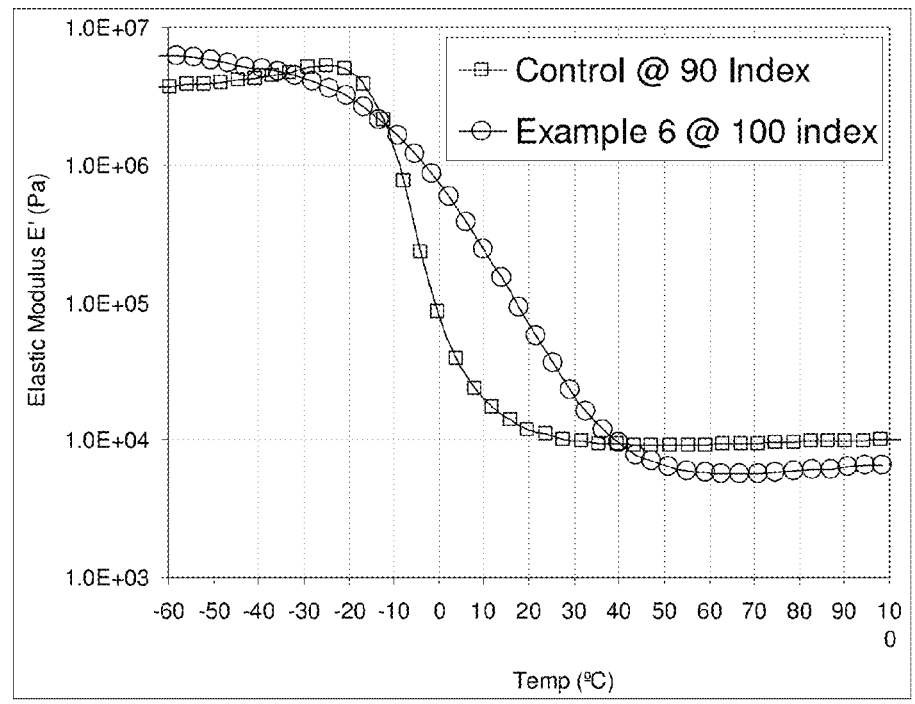
FIG. 7 is a graphical representation illustrating DMTA profile for a viscoelastic polyurethane foam of the present inventions compared with a DMTA profile for a reference viscoelastic foam.
Figure 8:
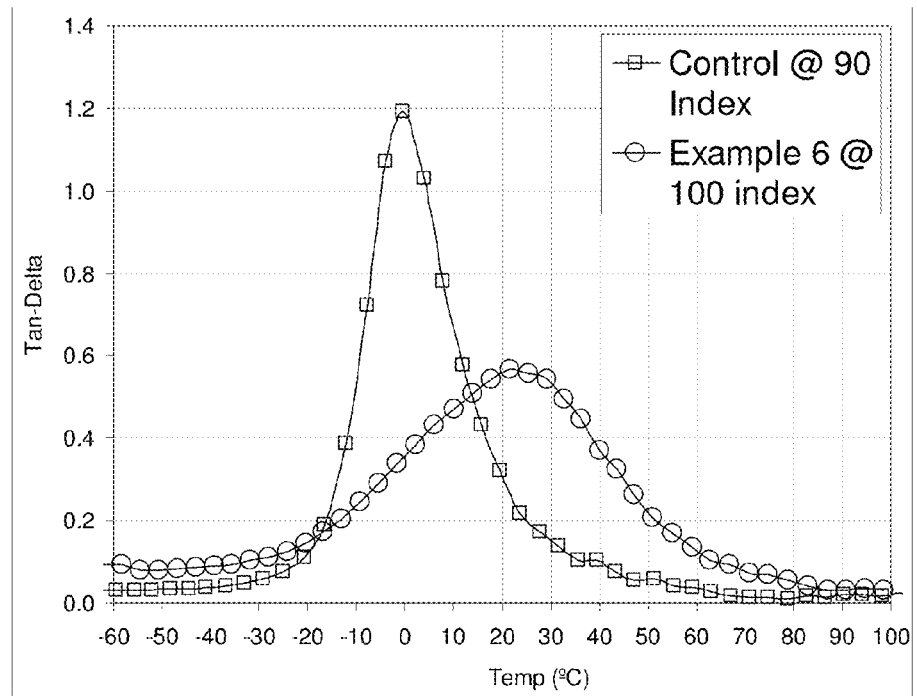
FIG. 8 is a graphical representation of the tan delta profile for a viscoelastic polyurethane foam of the present invention compared with a reference (Control) viscoelastic foam.

FIGS. 7 and 8 show E' and tan delta plots of the control foam and foam of example 6 as measured by DMTA. DMTA is measured using a TA Instruments RSA III Rheometer with the cylindrical tension/compression geometry fixture. The test type is a Dynamic Temperature Ramp method with an initial temperature of −115.0° C. and a final temperature of 250° C. at a ramp rate of 3.0° C./min.

The plots shows the foam of the present invention has a broad tan delta profile with a tan delta greater than 0.3 from 0 to 40° C. The plot also shows there substantial shift in the Tg versus the control. The elastic modulus of the foams of the present invention shows an increased modulus (stiffness) yet feels soft to the touch as measured by the 25% CFD. Tan delta is used to designate the tangent of the phase angle between an applied stress and strain response in dynamic mechanical analysis. High tan delta values imply that there is a high viscous component in the material behavior and hence a strong damping to any perturbation will be observed. The tan delta is determined using the same instrument and methodology as described for the elastic modulus.

Table 3 gives further properties of the foam, including the E' to CFD 25% ratios normalized to the foam densities. The show the foams of the present invention have a substantial higher E' to CFD 25% ratios than the control foam.

TABLE 3

| | 1C | 1 | 2 | 3 | 4 | 5 | 6 | 7 |
|---|---|---|---|---|---|---|---|---|
| Density (pcf) (16.02 Kg/m3) | 4.15 | 4.06 | 3.55 | 3.43 | 3.44 | 3.49 | 3.81 | |
| Air Flow (scfm) (.4720 l/s) | 0.23 | 6.17 | 4.46 | 3.70 | 2.73 | 2.35 | 3.00 | |
| Recovery Time (Sec) | 6 | 2 | 3 | 3 | 2 | 2 | 2 | |
| CFD 25% (lbf) (0.4536 kgf) | 3.79 | 0.71 | 1.37 | 1.76 | 2.77 | 4.76 | 4.00 | 1.04 |
| Support Factor | 2.20 | 3.62 | 2.85 | 2.66 | 2.29 | 2.14 | 2.20 | |
| CFD 25% (psi) | 0.24 | 0.04 | 0.09 | 0.11 | 0.17 | 0.30 | 0.25 | 0.065 |
| Normalized CFD 25% (psi/pcf) (0.430 KPa-m3/Kg) | 0.057 | 0.011 | 0.024 | 0.032 | 0.050 | 0.086 | 0.066 | |
| E' @ 20° C. (psi) (6.8948 KPa) | 1.70 | 4.58 | 3.38 | 4.98 | 11.42 | 13.11 | 10.06 | 7.77 |
| Normalized E' @ 20° C. (psi/pcf) (0.430 KPa-m3/Kg) | 0.410 | 1.129 | 0.954 | 1.450 | 3.325 | 3.762 | 2.641 | |
| Normalized E' (@20° C./CFD-25% | 7 | 104 | 39 | 45 | 66 | 44 | 40 | |
| E' (psi)/CFD 25% (psi) | 7.1 | 114.5 | 37.6 | 45.3 | 67.2 | 45.9 | 40.2 | 120 |

While the foregoing is directed to embodiments of the present invention, other and further embodiments of the invention may be devised without departing from the basic scope thereof, and the scope thereof is determined by the claims that follow.

What is claimed is:

1. A polyol composition comprising:
   a1) from 30 to 80 weight percent, based on a total weight of the polyol composition, of at least one polyoxypropylene or a polyoxyethylene-polyoxypropylene polyol, having an average equivalent weight between 100 and 2000 and an average nominal hydroxy functionality of 2-4, with the proviso if the polyol is a polyoxyethylene-polyoxypropylene polyol, the polyoxypropylene content is at least 70% by weight of the polyol;
   a2) from 5 to 50 weight percent, based on the total weight of the polyol composition, of a polyoxyethylene or a polyoxyethylene-polyoxypropylene polyol, having an average equivalent weight between 100 and 1000; and an average nominal hydroxy functionality of 2-4, with the proviso if the polyol is a polyoxyethylene-polyoxypropylene polyol, the polyoxyethylene content is at least 70% by weight of the polyol; and
   a3) from 1 to 20 wt %, based on the total weight of the polyol composition, of:
      (i) a monol or blend of monols having an average equivalent weight of 500 or greater and comprising >60% by weight of a polyoxyalkylene, wherein the alkylene oxide contains 4 or more carbon atoms;
      (ii) a polyoxyalkylene polyol having a functionality of 2 to 4, an equivalent weight of 500 to 3000 wherein the alkylene oxide contains greater than 60% by weight of alkylene oxides having 4 or more carbon atoms;
      (iii) a polybutadiene having an equivalent weight of 2250 to 6000; or
      (iv) a combination thereof.

2. The composition of claim 1 wherein the polyol a1) comprises two separate polyols a1a) having an equivalent weight of 200 to 700, and a1b) having an equivalent weight of greater than 700.

3. The polyol composition of claim 2 wherein the polyoxypropylene content based on a1a) and a1b) is at least 75 wt percent.

4. The polyol composition of claim 3 wherein the polyoxypropylene content based on a1a) and a1b) is at least 85 wt percent.

5. The polyol composition of claim 1 wherein the component a3) includes the polybutadiene having an equivalent weight of 2200 to 5500.

6. A process for preparing a viscoelastic polyurethane foam, comprising
   A) forming a reaction mixture including at least
      a) an isocyanate reactive component comprising the polyol composition as claimed in claim 1;
      b) at least one polyisocyanate,
      c) water in an amount of 0.5 to 3.5 weight percent of a), and
      d) optional additives and auxiliaries; and
   B) subjecting the reaction mixture to conditions sufficient to cause the reaction mixture to expand and cure to form a viscoelastic polyurethane foam.

* * * * *